United States Patent
Ogura

(10) Patent No.: US 6,556,133 B2
(45) Date of Patent: Apr. 29, 2003

(54) VEHICLE-USE SURROUNDINGS MONITORING SYSTEM

(75) Inventor: Hiroyuki Ogura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/120,545

(22) Filed: Apr. 12, 2002

(65) Prior Publication Data

US 2002/0149476 A1 Oct. 17, 2002

(30) Foreign Application Priority Data

Apr. 16, 2001 (JP) ........................................ 2001-116939

(51) Int. Cl.$^7$ ................................................ B60Q 7/00
(52) U.S. Cl. ........................ 340/435; 348/148; 348/149; 340/903
(58) Field of Search ................................ 340/901, 903, 340/435, 436, 937; 367/909; 701/300–302; 348/148, 149

(56) References Cited

U.S. PATENT DOCUMENTS 5,699,057 A * 12/1997 Ikeda et al. ................. 340/937
6,057,754 A * 5/2000 Kinoshita et al. ........... 340/435
6,218,960 B1 * 4/2001 Ishikawa et al. ............ 340/901

FOREIGN PATENT DOCUMENTS

JP          7-50769          2/1995

* cited by examiner

Primary Examiner—Daniel J. Wu
Assistant Examiner—Lam Pham
(74) Attorney, Agent, or Firm—Armstrong, Westerman & Hattori, LLP

(57) ABSTRACT

A vehicle-use surroundings monitoring system is provided, wherein a driver is prevented from driving without acknowledging that the detection of an approaching vehicle traveling in the adjacent lane area cannot be carried out because the driver is informed of the existence of an abnormally approaching following vehicle obstructing to image-take the adjacent lanes. An existence judging means (3a-3) judges the existence of the abnormally approaching following vehicle traveling on the subject lane and obstructing to image-take the adjacent lanes by an image-taking means. When the existence judging means (3a-3) judges that the abnormally approaching following vehicle exists, an alarm generating means (5) issues an alarm.

12 Claims, 10 Drawing Sheets

(a)

VEHICLE-USE SURROUNDINGS MONITORING SYSTEM

BACKGROUND OF THE INVENTION

1. Field of the invention

The present invention relates generally to a vehicle-use surroundings monitoring system and more particularly to a vehicle-use surroundings monitoring system which monitors the surroundings of a vehicle for giving alarm to a driver by detecting another vehicle approaching from the surroundings of the subject traveling vehicle by using an image obtained by image-taking the road around the subject vehicle by means of an image-taking means such as a camera installed on the subject vehicle.

2. Description of the Related Art

For example, when a vehicle (the subject vehicle) traveling on the road, such as a highway, with plural lanes changes the lane and simultaneously another vehicle is traveling in the vicinity in an adjacent lane and is catching up with the subject vehicle from the rear-and-side, if the subject vehicle carries out the change of the lane while not awaring of the existence of another vehicle, a big accident would occur.

And, when another vehicle travels behind the subject vehicle on the same lane as the subject vehicle with a higher speed and if the subject vehicle, for example, brakes suddenly, a collision would occur. Therefore, secure awareness of another vehicle in the vicinity is desirable.

Further, when the subject vehicle changes the lane and another vehicle slower than the subject vehicle is traveling obliquely ahead of the subject vehicle on the adjacent lane, there would also be a danger of collidation, which reqirues secure awareness of another vehicle in the vicinity.

A vehicle-use surroundings monitoring system disclosed in Japanese Patent Application Laid-open No.7-50769 is provided for solving the above problems. This vehicle-use surroundings monitoring system will be described in reference to FIGS. 9a–9d, which explain a change of a rear-and-side image obtained by a camera 1. FIGS. 9b,9c show images taken by the camera 1 of the subject vehicle at time t, t+Δt respectively.

When the subject vehicle goes straight on a flat road, for example a road sign and a building shown in FIG. 10a are imaged as shown in FIGS. 10b,10 c at time t, t+Δt respectively. When corresponding points in the two images are searched and connected, velocity vectors, i.e. optical flows, shown in FIG. 10d are obtained. The prior art vehicle-use surroundings monitoring system detects the existence of another vehicle approaching the subject vehicle by monitoring a relative location between the subject vehicle and another vehicle traveling nearby by using the optical flow and raises an alarm.

Still another prior art uses two cameras, an edge point Pa of an object (not shown) is detected by examining the luminance difference between the neighboring pixels of the image taken by one of the cameras, and a corresponding point Pb (not shown), of the image taken by the other camera, corresponding to the detected edge point is detected. And, a position of the approaching vehicle with resprct to the subject vehicle is calculated based on the pixel coordinates of the points Pa and Pb, and an alarm informing of the existence of another vehicle approaching the subject vehicle is issued based on the above calculated position.

In still another prior art shown in FIG. 10, white lines of the lane on which the subject vehicle travels are detected by image-processing a taken-image, a cruising lane of the subject vehicle is distinguished from the adjacent lane area, and a detection of another vehicle is performed on each monitoring area, whereby it is judged whether another vehicle detected exists in the subject lane or the adjacent lane. In this case, since a monitoring area is limited, the processing time is reduced.

However, with respect to the above prior art of judging whether the approaching vehicle exists in the subject lane or the adjacent lane, there are problems stated below. As shown in FIG. 11a, when the following vehicle 100 is traveling after the subject vehicle with some distance, an adjacent vehicle 200 traveling far-off on the adjacent lane can be image-taken by the camera 1.

However, as shown in FIG. 11b, when the following vehicle 100 is traveling abnormally near the subject vehicle, the adjacent vehicle 200 cannot be image-taken with the camera 1.

When a state of the adjacent lane cannot be recognized with the image taken by the camera as stated above, the image of the following vehicle 100 overlapping with the adjacent lane area could be mis-detected as an adjacent vehicle 200. And, when the camera 1 is installed in order to image-take the front-and-side of the subject vehicle and when the subject vehicle is traveling abnormally near a front vehicle, the similar problem would arise.

SUMMARY OF THE INVENTION

In view of the foregoing, an object of the the present invention is to provide a vehicle-use surroundings monitoring system wherein a driver is prevented from driving without acknowledging that the detection of an approaching vehicle traveling in the adjacent lane area cannot be carried out by informing the driver of the existence of an abnormally approaching following vehicle obstructing to image-take the adjacent lanes.

In order to achieve the above object, as a first aspect of the present invention as shown in FIG. 1, a vehicle-use surroundings monitoring system comprises: an image-taking means 1 installed on a subject vehicle to take an image of surroundings of the subject vehicle to obtain a taken-image; an approaching vehicle detecting means 3a-1 to detect, by image-processing the taken-image, an approaching vehicle approaching the subject vehicle from an adjacent lane area; a danger judging means 3a-2 to judge dangerousness about the approaching vehicle detected; an existence judging means 3a-3 to judge an existence of an abnormally approaching following vehicle traveling on an subject lane ahead of or behind the subject vehicle and obstructing to image-take the adjacent lane area by the image-taking means; and an alarm generating means 5 to give out an alarm when the existence judging means judges that the abnormally approaching following vehicle exists.

According to the first aspect, because the alarm generating means informs that an image-taking of the adjacent lane by the image-taking means is obstructed so that the driver can recognize that the detection of an approaching vehicle traveling on the adjacent lane can not be carried out, the vehicle-use surroundings monitoring system can prevent the driver from driving without knowing that the detection of an approaching vehicle traveling in the adjacent lane area cannot be done.

As a second aspect of the present invention as shwon in FIG. 1, based on the first aspect, the existence judging means has an imaged vehicle detecting means 3a-31 to image-process the taken-image in order to detect an image-taken vehicle having been image-taken by the image-taking means, and the existence of the abnormally approaching following vehicle is judged based on the image-taken vehicle detected.

According to the second aspect, because the existence of an abnormally approached vehicle can be judged by detecting the abnormally approached vehicle based on the taken-image without providing an extra means other than the image-taking means, the vehicle-use surroundings monitoring system with reduced cost can be obtained.

As a third aspect of the present invention as shwon in FIG. 1, based on the second aspect, the imaged vehicle detecting means has a storing means 2d having stored vehicle images giving shape of respective vehicles, an extracting means 3a-311 to extract a vehicle candidate image to be a candidate of the image-taken vehicle from the taken-image, and a similarity calculating means 3a-312 to calculate a similarity-degree between the vehicle images and the vehicle candidate image, and the image-taken vehicle is detected when the similarity-degree is not less than a predetermined value.

According to the third aspect, because the similarity-degree of the vehicle candidate image against the vehicle images can be calculated, the vehicle-use surroundings monitoring system facilitating the detection of the vehicle can be obtained.

As a fourth aspect of the present invention, based on the third aspect, the storing means stores two or more kinds of vehicle images on one frame memory in order, and the similarity calculating means shifts the vehicle candidate image on the frame memory, executes a matching with each of the vehicle images, and calculates the similarity-degree.

According to the fourth aspect, because the matching is executed by shifting the vehicle candidate image over the frame memory on which two or more kinds of vehicle images are arranged, the calculation of the similarity-degree against the two or more kinds of vehicle images can be done with one matching processing for one vehicle candidate image, whereby the vehicle-use surroundings monitoring system attaining reducion of the similarity-degree calculation can be obtained.

As a fifth aspect of the present invention as shwon in FIG. 1, based on the first aspect, the vehicle-use surroundings monitoring system further comprises: an area specifyng means 3a-4 to specify an area, where an image-taking is obstructed by the abnormally approaching following vehicle, in the adjacent lane area when the existence judging means judges that the abnormally approaching following vehicle exists, and the danger judging means judges a degree of danger about the approaching vehicle traveling on the adjacent lane area except the area specified.

According to the fifth aspect, when there exists even a little area where the detection of an approaching vehicle is possible by the image-taking means in the adjacent lane areas, an approaching vehicle can be detected. Besides, an adjacent vehicle traveling in the adjacent lane can be prevented from being mis-detected as a just following vehicle or a preceding vehicle by judging the degree of danger about an approaching vehicle detected in the area where the image-taking is obstructed, whereby the vehicle-use surroundings monitoring system with improved reliability in judging dangerousness can be obtained.

As a sixth aspect of the present invention, based on the fifth aspect, an specifying by the area specifying means is executed before a detection by the approaching vehicle detecting means, and the approaching vehicle detecting means image-processes the adjacent lane area except the area specified and detects the approaching vehicle.

According to the sixth aspect, because the image processing is executed for the taken-image except the specified area, the vehicle-use surroundings monitoring system attaining reduction of the image processing can be obtained.

As a seventh aspect of the present invention as shwon in FIG. 1, based on any one of the first to sixth aspects, the approaching vehicle detecting means has an area setting means 3a-11 to set the adjacent lane area on the taken-image based on separation lines provided on a road surface and an optical flow detecting means 3a-12 to detect, as an optical flow, a movement of a same point in two adjacent lane areas obtained by the image-taking means with an interval of a specified time, and the danger judging means judges the dangerousness based on a size of the optical flow detected by the optical flow detecting means.

According to the seventh aspect, since the approaching vehicle can be detected on the basis of the size of the optical flow, two image-taking means does not need to be used, thereby attaining cost reduction.

DESCRIPTION OF THE PREFERRED EMBODIMENT(S)

Figure 1:
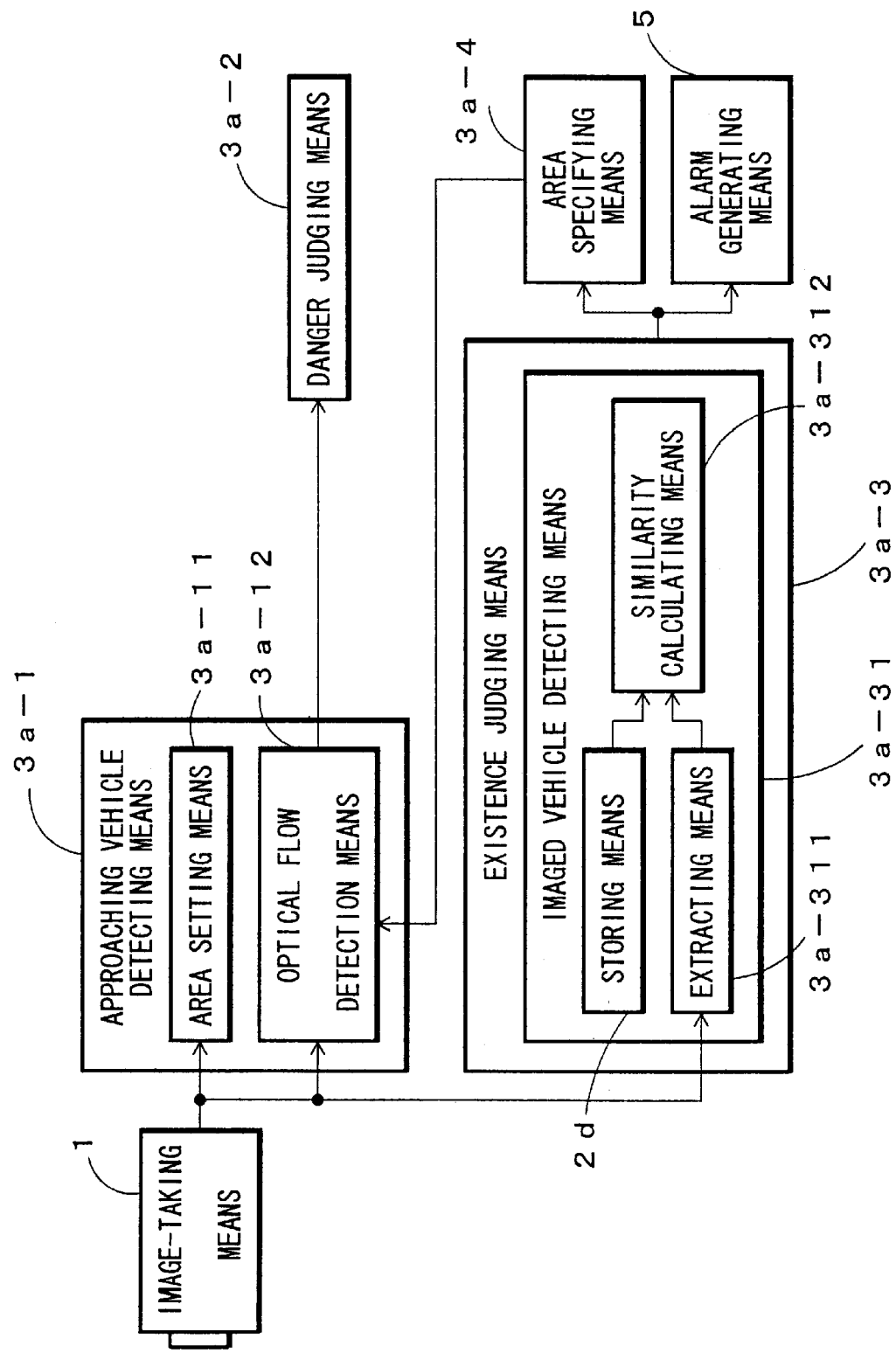
FIG. 1 is a block diagram showing a basic structure of the inventive vehicle-use surroundings monitoring system.
Figure 2:
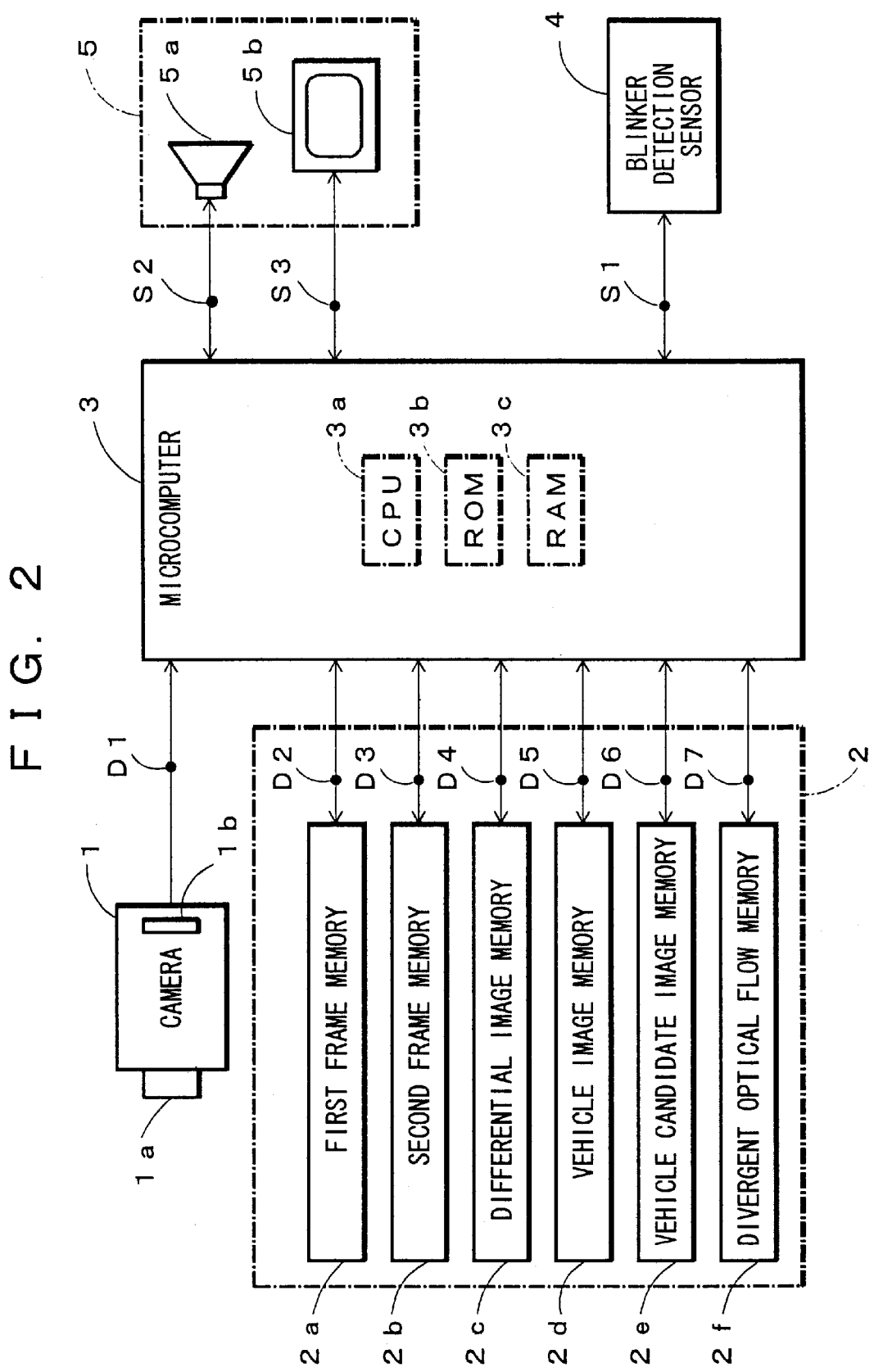
FIG. 2 is a block diagram showing an embodiment of the inventive vehicle-use surroundings monitoring system.

Embodiment(s) of the present invention will now be described in further detail with reference to the accompanying drawings. FIG. 2 is a block diagram showing an embodiment of the inventive vehicle-use surroundings monitoring system. A camera 1 as an onboard image-taking means image-forms an image of an angle of view decided with a lens 1a. And, the camera 1 is installed at a position from which the rear-and-side of the vehicle is a monitoring area.

A memory portion 2 has a first frame memory 2a, a second frame memory 2b, a differential image memory 2c, a vehicle image memory 2d as a storing means, a vehicle candidate image memory 2e, and a divergent optical flow memory 2f. The first frame memory 2a and the second frame memory 2b temporarily store, as taken-image pixels D2,D3 respectively, a taken-image D1 formed on an image plane 1b of the camera 1 after converting it into pixels of m rows and n columns, for example 512*512 pixels with the luminance of 0–255 gradation, and output the taken-image pixels D2,D3 to a microcomputer 3.

The taken-image pixels (D2 or D3), having been converted into m*n pixels, are stored in the first or the second frame memory 2a or 2b by turns with the passage of time (t, t+Δt, t+2 Δt, - - - ).

A differential image D4 formed by differentiating the taken-image pixels D2 or D3 is stored in the differential image memory 2c. And, in the vehicle image memory 2d, images giving shape of vehicles such as a passenger automobile, a one-box automobile, a truck, a motorcycle, and the like are prestored as moving object images D5. A vehicle candidate image D6 extracted from the differential image D4 is stored in the vehicle candidate image memory 2e temporarily. A divergent optical flow D7 in a direction is stored in the divergent optical flow memory 2f. And, the stored divergent optical flow D7 is outputted to the microcomputer 3.

The microcomputer 3 stated above is installed in a blinker mechanism of the vehicle and connected to a blinker detection sensor 4 which outputs a blinker signal S1 of High-level when a blinker switch is turned on.

The microcomputer 3 has a central processing unit (CPU) 3a which works according to the control program, ROM 3b holding the control program of the CPU 3a and preset values, and RAM 3c temporarily holding data necessary when the CPU 3a executes the operation.

The above the CPU 3a is connected to an alarm generating portion 5. The alarm generating portion 5 has a speaker 5a and a display 5b. The speaker 5a give out a voice alarm on the basis of an audio signal S2 outputted from the CPU 3a when the CPU 3a judges to be dangerous of the contact with the approaching object or judges that there exists an abnormally approaching following vehicle traveling on the subject lane and obstructing to image-take the adjacent lanes by the camera.

And, the display 5b displays an image taken by the camera 1 and also informs the driver of dangerousness by meas of a message thereon on the basis of a picture signal S3 outputted from the CPU 3a when the CPU 3a judges to be dangerous of the contact with the approaching object or an abnormally approaching following vehicle exists.

Figure 3:
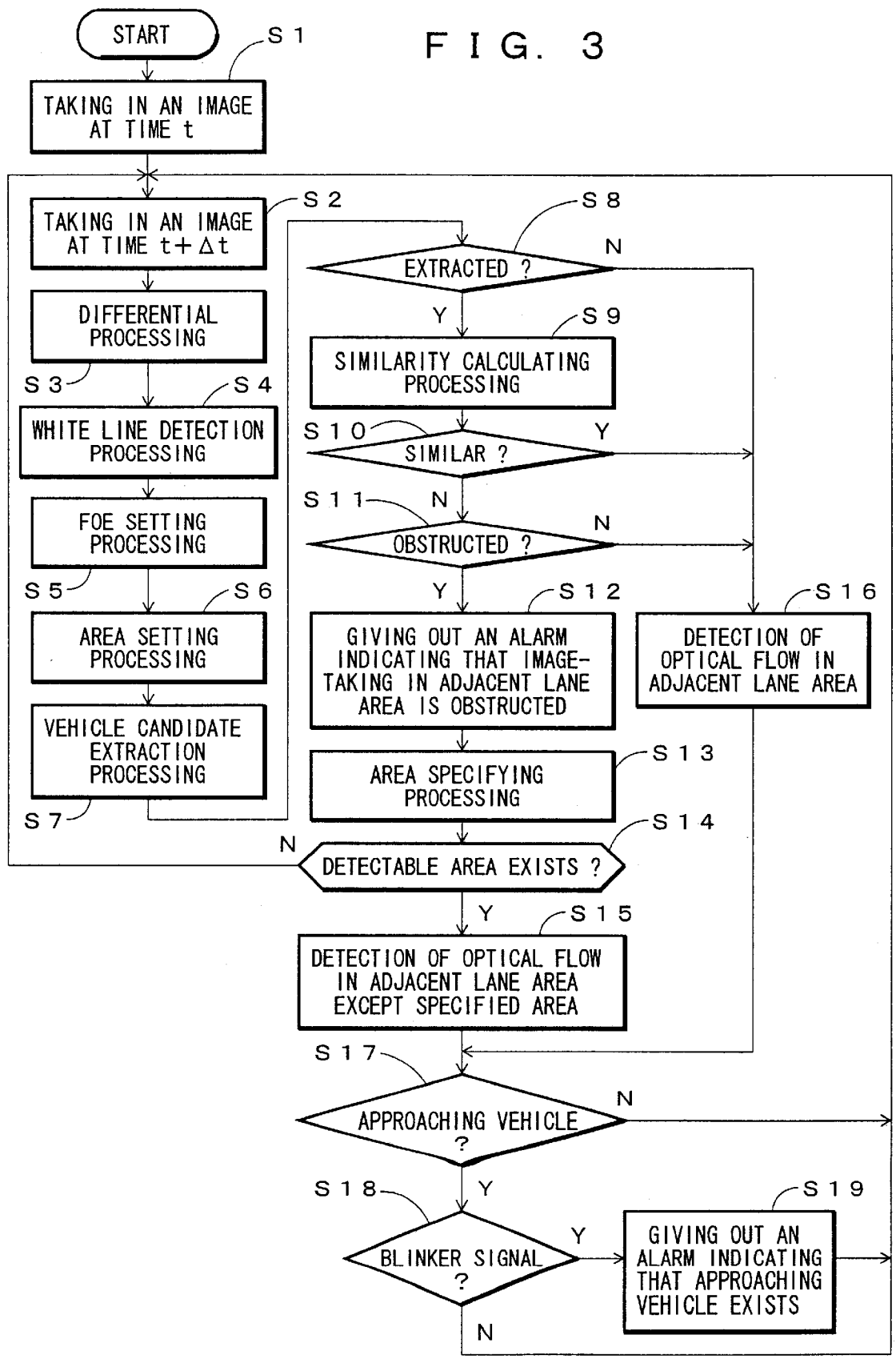
FIG. 3 is a flowchart showing a routine of the CPU 3a of the vehicle-use surroundings monitoring system of FIG. 2.

An operation of the vehicle-use surroundings monitoring system is described hereinafter in reference to a flowchart of FIG. 3. The CPU 3a takes in the taken-image D1 from the camera 1, converts the taken-image D1 into pixel data, and stores the pixel data in the first frame memory 2a as the taken-image pixels D2 at time t (Step S1).

Next, the CPU 3a converts the taken-image D1 taken at time t+Δt into pixel data and outputted it to the second frame memory 2b as the taken-image pixels D3 at time t+Δt (Step S2).

Figure 4:
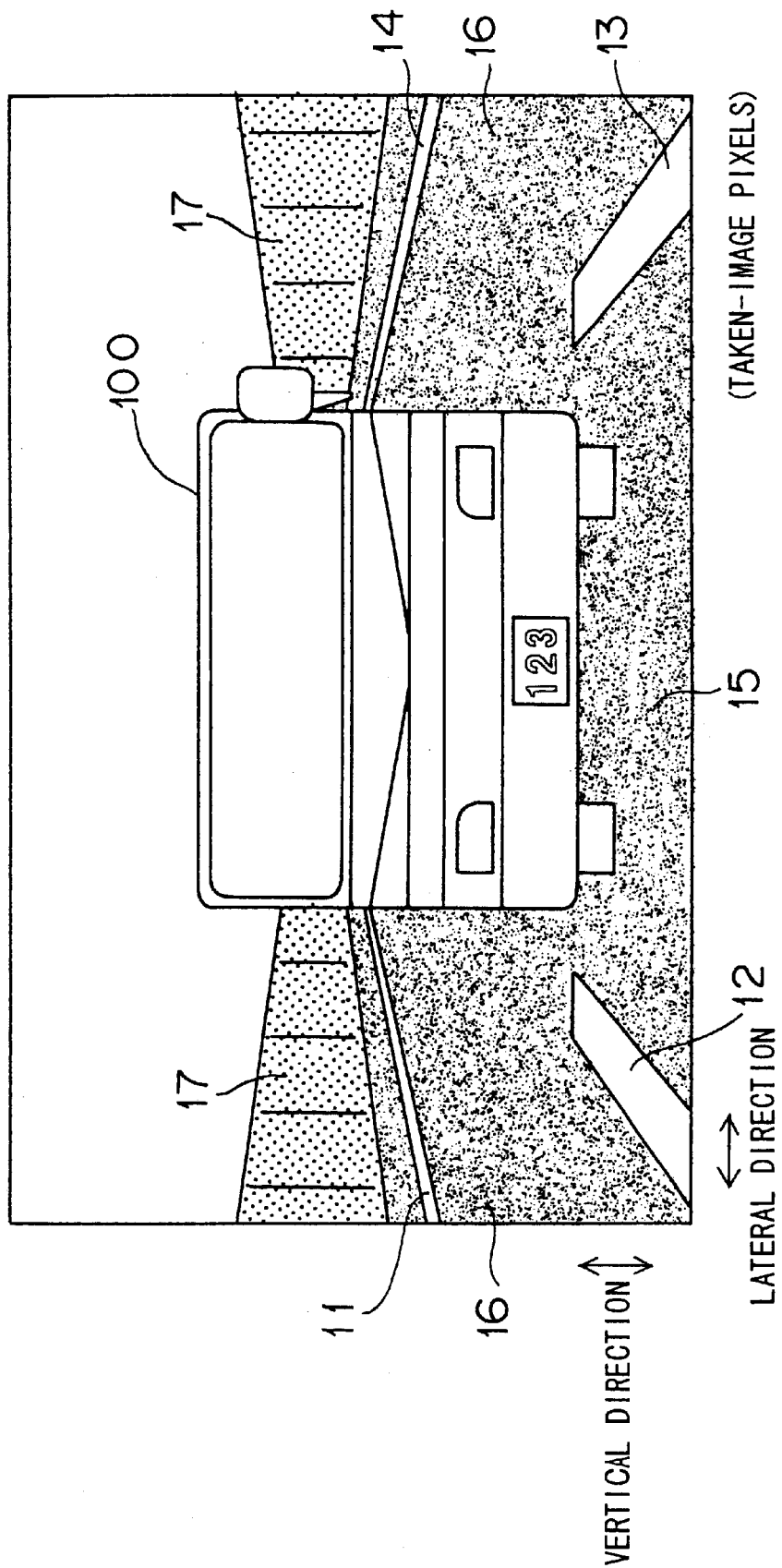
FIG. 4 is a schema showing taken-image pixels taken by a camera.

As shown in FIG. 4, in the taken-image pixels D2 or D3 the road is divided into the subject lane 15 and the adjacent lanes 16, 17 by the white lines 11–14. And, when the images D2 or D3 is taken, an image in the adjacent lane 16 far from the suject vehicle is obstructed by the following vehicle 100 following the subject vehicle.

Because the camera 1 is mounted at the rear of the vehicle, the right side of the taken-image pixels D2 or D3 corresponds to the driving left side, and viceversa. .

Next, the CPU 3a executes the differential processing on the taken-image pixels D2 or D3 whichever is of Δt ago (Step S3). Here, the taken-image pixels D2 are assumed to have been image-taken Δt ago. The CPU 3a, first, laterally scans the taken-image pixels D2 shown in FIG. 4 so as to obtain the luminance value $I_{m,n}$ of each pixel of pixels m×n, sets the luminance value as $I_{m,n}=1$ when a difference $I_{m,n+1}-I_{m,n}$ between the luminance value $I_{m,n+1}$ and the luminance value, of the adjacent pixel, $I_{m,n}$ is not less than a predetermined luminance value, and sets the luminance value as $I_{m,n}=0$ when the difference $I_{m,n+1}-I_{m,n}$ is smaller than the predetermined luminance value.

Figure 5:
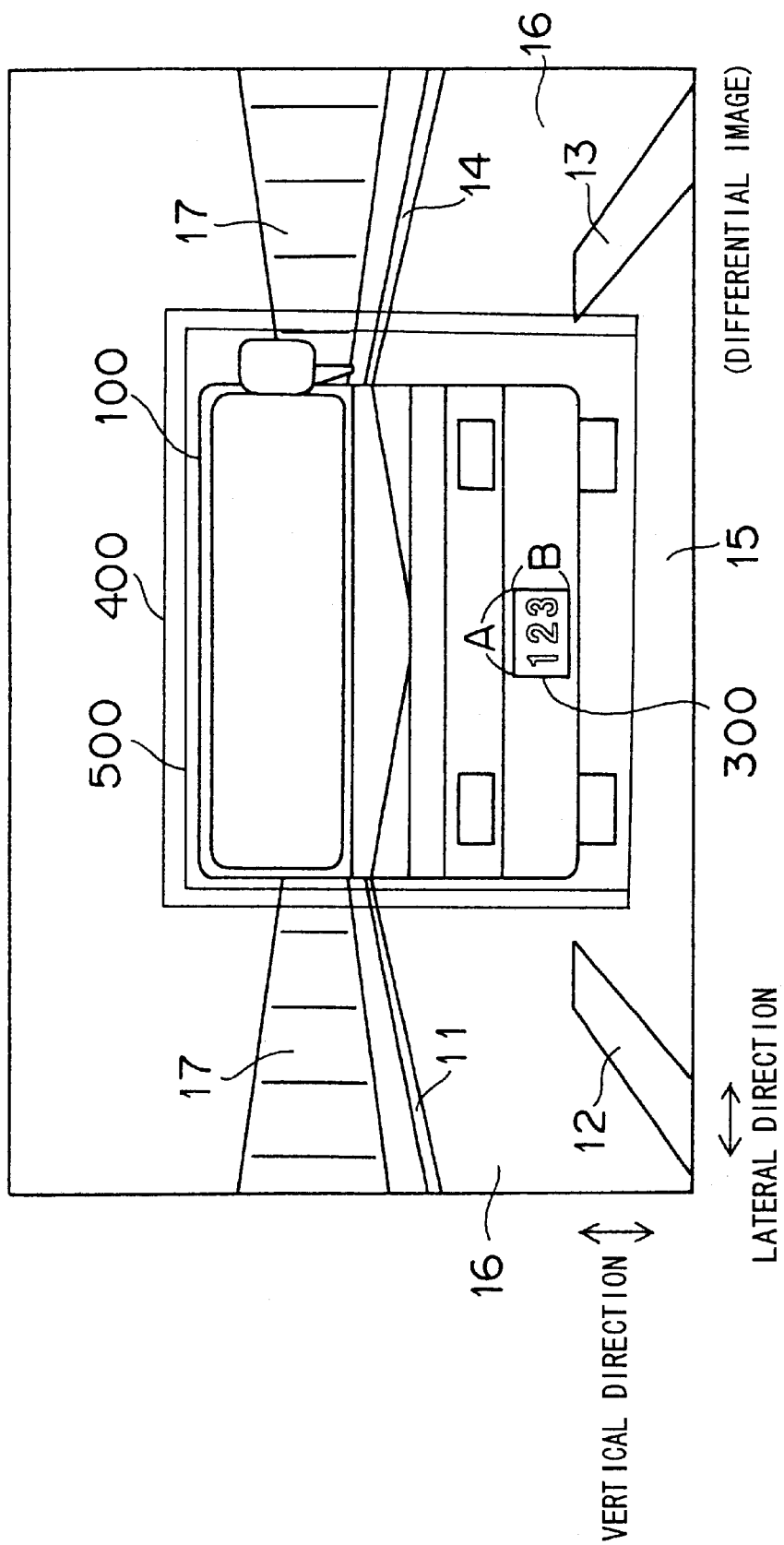
FIG. 5 is a schema to explain a differential image obtained by differential-processing the taken-image pixels.

And, the scan is similarly carried out vertically in order to produce the differential image D4, of FIG. 5, made up of characteristic points on the taken-image pixels D2, and the CPU 3a outputs the differential image D4 to the differential image memory 2c.

Figure 6:
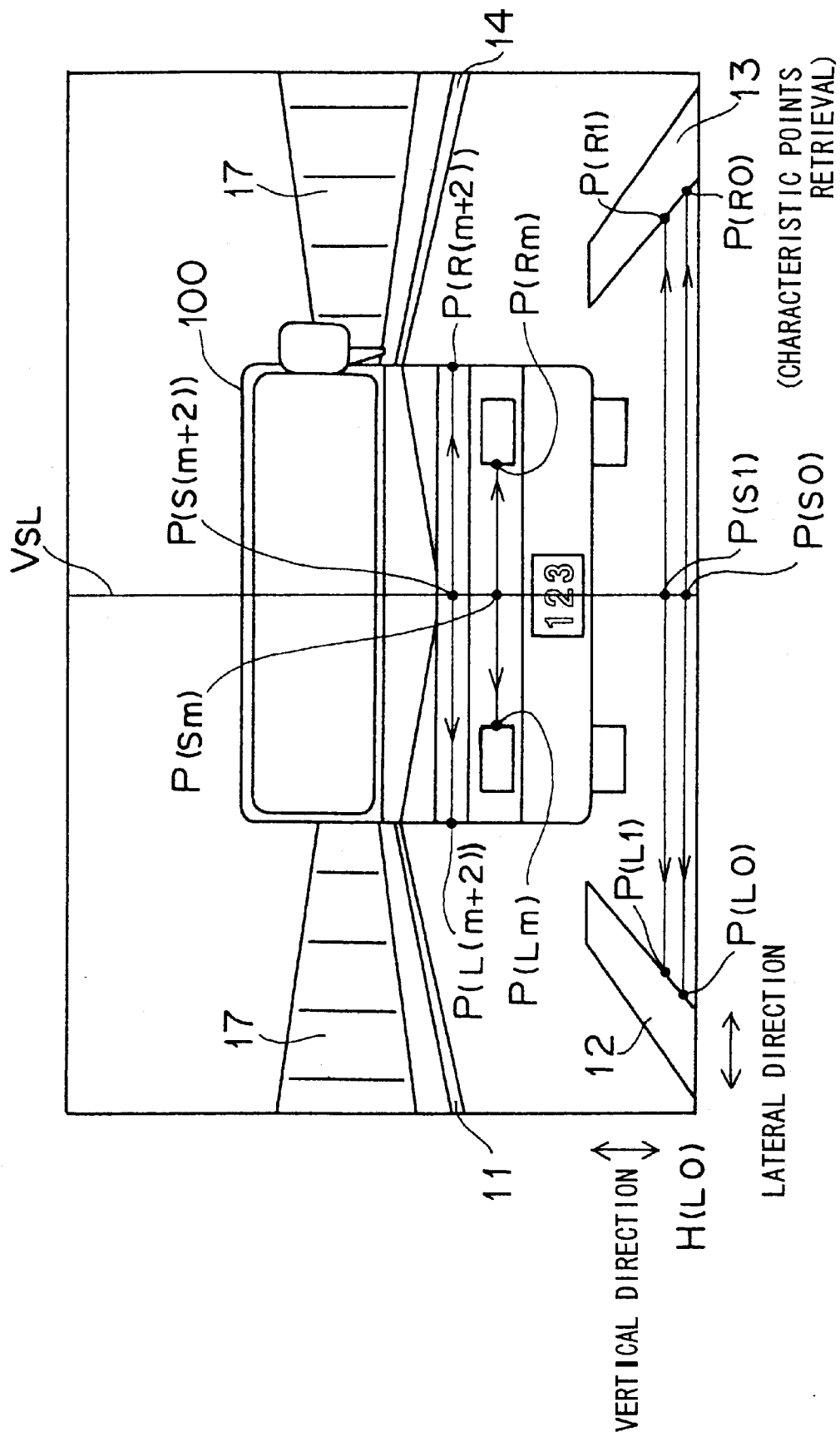
FIG. 6 is a schema to explain an operation of a white line detection processing.

Next, the CPU 3a executes a white line detection processing on the differential image D4 for detecting characteristic points forming the white line (Step S4). The white line detection processing is described hereinafter. First, a datum line $V_{SL}$ shown in FIG. 6 is set with respect to the differential image obtained by the above differential processing. The datum line $V_{SL}$ runs vertically at the lateral center of the differential image D4. In other words, the datum line $V_{SL}$ is set at the lateral center of the subject lane, between the white lines 12,13, on which the subject vehivle is traveling.

Next, the characteristic points forming the white lines 12,13 are retrieved upwardly from the horizontal line $H_{(LO)}$ positioned at the bottom end of the display shown in FIG. 6. Specifically, the retrieval is carried out from the bottom point $P_{(SO)}$ located on the datum line VSL toward the both lateral ends. And, the characteristic point $P_{(LO)}$ forming an edge of the white line 12 laocated to the left of the datum line $V_{SL}$ and the characteristic point $P_{(RO)}$ forming an edge the white line 13 located to the right of the datum line $V_{SL}$ are obtained.

Following the above, the retrieval or search of the characteristic points is executed from the next characteristic point $P_{(S1)}$ toward the both lataral ends, and the characteristic point $P_{(L1)}$ forming an edge of the white line 12 laocated to the left of the datum line $V_{SL}$ and the characteristic point $P_{(R1)}$ forming an edge the white line 13 located to the right of the datum line $V_{SL}$ are obtained.

The similar processing is executed successively upward on the differential image D4. With the above processings, characteristic points forming the following vehicle 100, namely $P_{(Lm)}$, $P_{(Rm)}$, $P_{(L(m+2))}$, and $P_{(R(m+2))}$, are extracted. And, only the characteristic points on the same line are extracted from the above extracted characteristic points. As a result, only the characteristic points forming a pair of white lines 12,13 located on both sides of the subject lane can be extracted. Here, approximate lines are produced from the extracted characteristic points by the least squares method so as to obtain the white lines 12,13.

Figure 7:
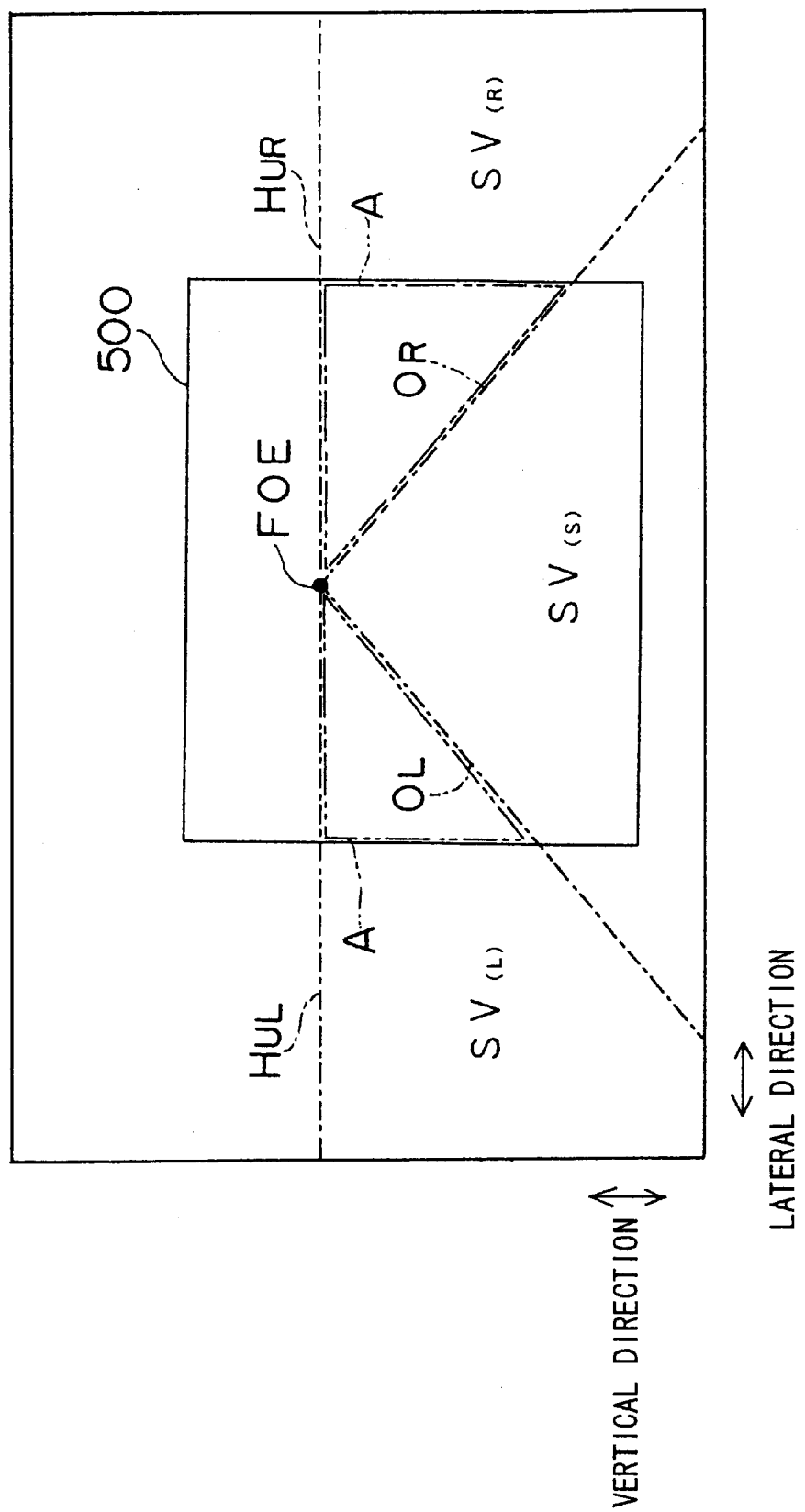
FIG. 7 is a schema to explain an operation of a monitoring area setting processing.

And, as shown in FIG. 7, the CPU 3a executes a FOE setting processing to extend the approximate lines $O_L,O_R$ detected as the white lines 12,13 and to set an intersection point as the FOE (Step S5). The FOE is called the infinite-point or the disappearance point. The white lines 11–14, the subject lane 15, the adjacent lane 16 and the wall 17 image-taken by the camera 1 disappear at the FOE.

Next, the CPU 3a executes an area setting processing (Step S6). The area setting processing is described hereinafter. The area setting processing is carried out based on the approximate lines $O_L,O_R$ detected as the white lines 12,13 at the above Step S4 and the FOE of the above Step S5. And, as shown in FIG. 7, a right side top line $H_{UR}$ being a boundary line laterally extending to the right from the above FOE, and a left side top line $H_{UL}$ being a boundary line laterally extending to the left are set. With the right side top line $H_{UR}$ and the approximate lines $O_L, O_R$, a right side adjacent lane area $SV_{(R)}$, a subject lane area $SV_{(S)}$, and a left side adjacent lane area $SV_{(L)}$ are set.

Next, the CPU 3a acts as the extracting means and executes a vehicle candidate extraction processing to extract a vehicle candidate image being a candidate of the imaged following vehicle in the taken-image (Step S7). The vehicle candidate extraction processing is described hereinafter. First, the CPU 3a executes an extraction of a number plate as a sign of the vehicle candidate image from the differential image D4. Specifically, the CPU 3a extracts horizontal straight lines and vertical straight lines in the subject lane area $SV_{(S)}$ to be set at the above Step S6, i.e. in an area expected to have the number plate of the following vehicle, in the differential image D4. The detection of the straight lines is carried out by the Hough transform and the like.

Next, the CPU 3a forms a quadrangle by combining the detected lines and extracts a quadrangular 300 with an aspect ratio of A:B (FIG. 5) to be a candidate of the number plate. Next, the CPU 3a extracts the differential image D4 of a vehicle candidate frame 400 relative to the extracted quadrangular 300 and stores it in the vehicle candidate image memory 2e as a vehicle candidate image D6. The larger the quadrangular 300 is, the larger the vehicle candidate frame 400 is, since the following vehicle should be larger when the following vehicle is traveling nearer, and viceversa. When the above extracted quadrangular 300 is the number plate, the characteristic point of the following vehicle should be included.

When the quadrangular 300 with the aspect ratio of A:B is not extracted by the vehicle candidate extraction processing of Step 7 or when the extracted quadrangular 300 is too small (Step S8, N), the CPU 3a judges that there is not an abnormally approaching following vehicle and the process goes to Step S16.

On the other hand, when the quadrangular 300, namely the vehicle candidate image D6, is extracted (Step S8, Y) by the vehicle candidate extraction processing of Step S7, whether or not the vehicle candidate image D6 is the following vehicle has to be check. Therefore, the CPU 3a acts as the similarity calculating means and carries out the similarity-degree calculating processing of the vehicle candidate image D6 and the vehicle image D5 stored in the vehicle image memory 2d (Step S9).

Figure 8:
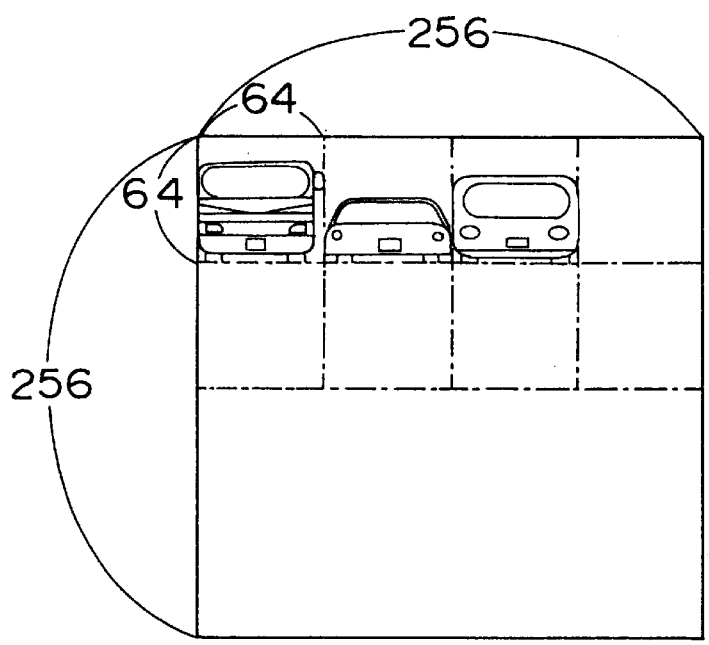
FIG. 8 is a schema to explain an operation of a similarity-degree calculating processing.
Figure 10:
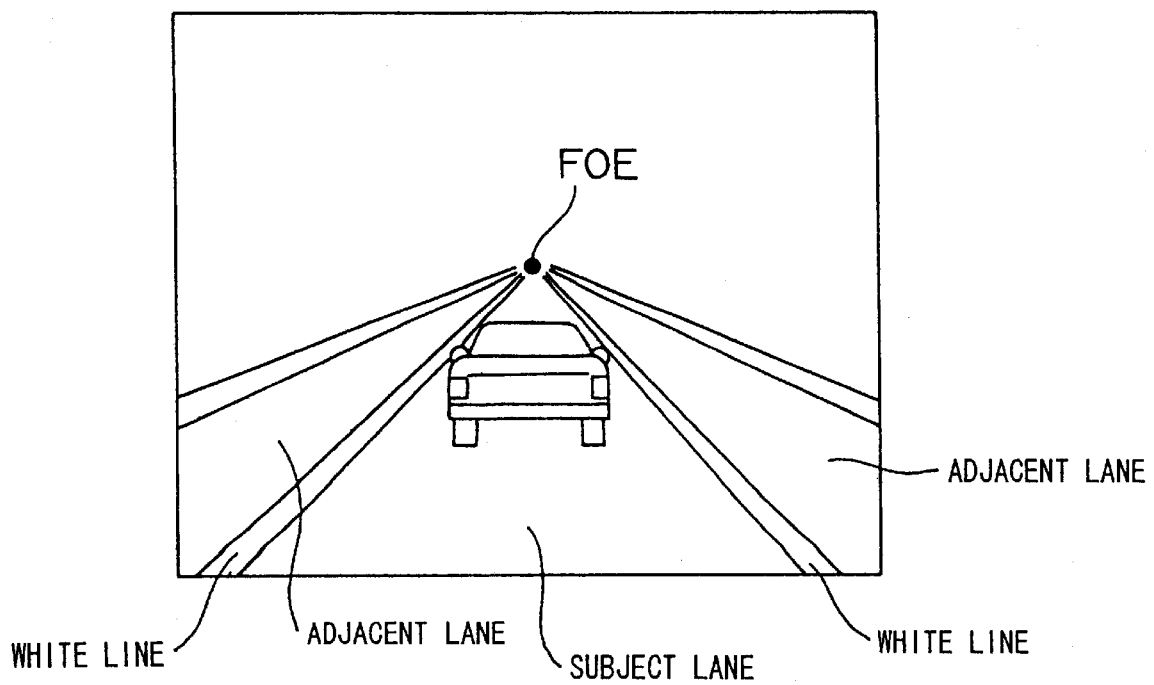
FIG. 10 is a schema showing an image of a highway with three lanes.
Figure 9A:
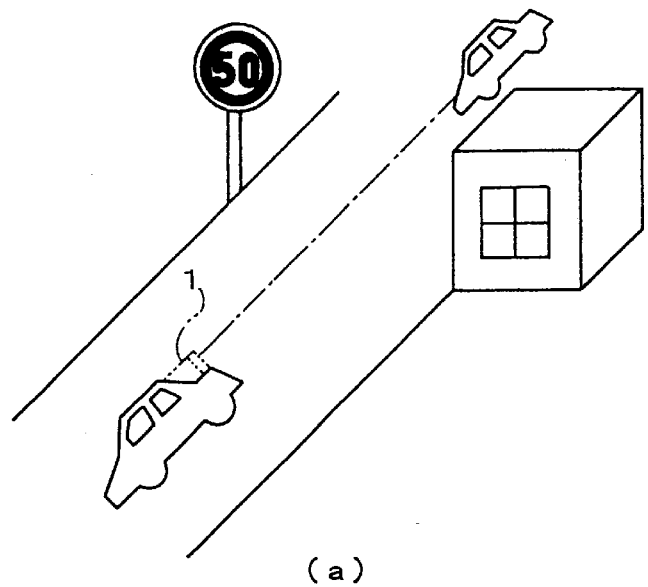
FIGS. 9a–9d are schemata to explain a change of a rear-and-side image obtained by a camera 1.
Figure 9B:
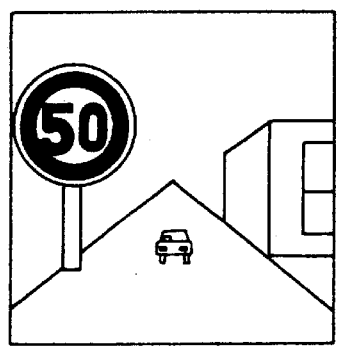
Figure 9C:
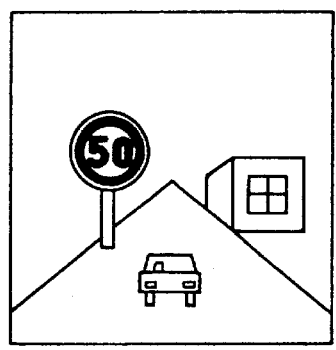
Figure 9D:
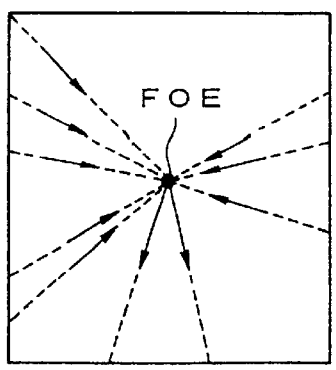
Figure 11A:
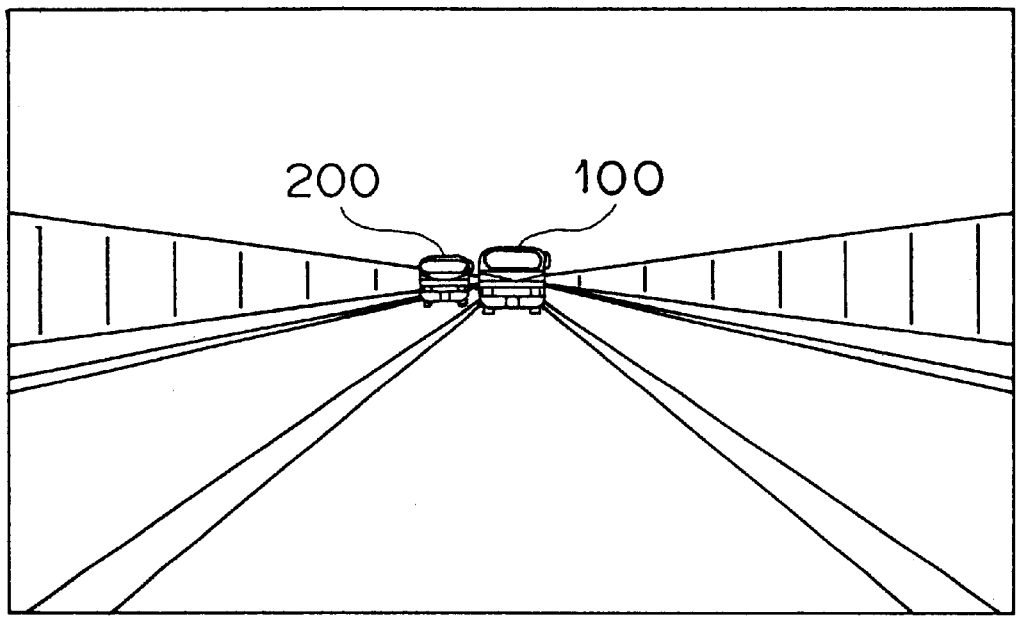
FIGS. 11a,11b are schemata showing iamges taken by a prior art vehicle-use surroundings monitoring system.
Figure 11B:
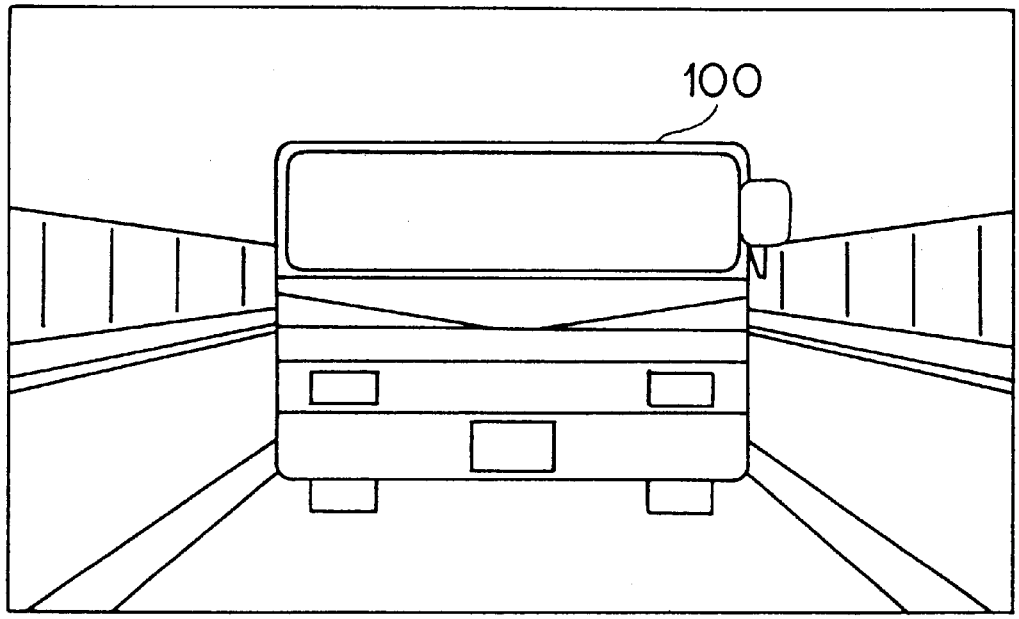

Here, as shown in FIG. 8, vehicle images D5 showing shapes of a truck, a passenger automobile, a wagon automobile, and the like are stored in the vehicle image memory 2d, i.e. on one frame memory. More specifically, when the frame memory has, for example, 256*256 pixels, the vehicle images D5 each having 64*64 pixels are arranged.

And, the CPU 3a converts the above vehicle candidate image D6 into 64*64 pixels similarly to the vehicle image D5, scans the frame memory to do the matching, and calculates the similarity-degree with respect to the vehicle image D5. And the CPU 3a judges that an abnormally approaching following vehicle does not exist when there is not a vehicle image D5 with similarity-degree not less than the predetermined value (Step S10, N), and the process goes to Step S16.

On the other hand, when a similarity-degree with the vehicle image D5 not less than a predetermined value (Step S10, Y) exists, the vehicle candidate image D6 is detected to be an image-taken following vehicle. And, the CPU 3a next judges whether the image-taken following vehicle is an abnormally approaching following vehicle abstracting to image-take the adjacent lane areas $SV_{(L)}$ and $SV_{(R)}$ (Step S11).

Specifically, with the above similar arithmetic processing, it is clarified that the image-taken following vehicle is a truck, a passenger automobile, or a wagon automobiles. If the kind of the vehicle is clarified, it can be estimated how large the image-taken following vehicle is image-taken in the vehicle candidate frame 400. Accordingly, the CPU 3a sets a vehicle frame 500 corresponding to the kind of vehicle in the vehicle candidate frame 400. For example, when the image-taken following vehicle is a passenger automobile, a frame to be considerably smaller than the vehicle candidate frame 400 is set. When the image-taken following vehicle is a wagon automobile, a frame to be a little smaller than the vehicle candidate frame 400 is set. And, when the image-taken following vehicle is a truck, a frame to be a little smaller than, i.e. almost equal to, the vehicle candidate frame 400 is set. In the present embodiment, the kind of the image-taken following vehicle is a truck (FIG. 5).

And, as shown in FIG. 7, the CPU 3a judges where the image-taken following vehicle obstructs to image-take the adjacent lane areas $SV_{(L)}$ and $SV_{(R)}$ based on a position or a largeness of the vehicle frame 500 and positions of the right side adjacent lane area $SV_{(R)}$, the subject lane area $SV_{(S)}$, and the left side adjacent lane area $SV_{(L)}$. When judged not to be obstructed (Step S11, N), the CPU 3a also judges that there is not an abnormally approaching following vehicle, and Step S16 is reached.

On the other hand, when judged to be obstructed (Step S11, Y), the CPU 3a judges that there is an abnormally approaching following vehicle, and an audio signal S2 or a picture signal S3 to inform the above state is outputted to the speaker 5a or the display 5b (Step S12) so that the driver can recognize that detection of an approaching vehicle traveling on the adjacent lane can not be carried out. As above, the CPU 3a acts as an imaged vehicle detecting means and an existence judging means.

And then the CPU 3a acts as an area specifyng means and carries out an area specifying processing to specify an area, where the image-taking of the adjacent lane areas $SV_{(R)}$ and $SV_{(L)}$ is obstructed by the abnormally approaching following vehicle, based on a position or a largeness of the vehicle frame 500 and positions of the right side adjacent lane area $SV_{(R)}$, the subject lane area $SV_{(S)}$, and the left side adjacent lane area $SV_{(L)}$.

Specifically, the CPU 3a specifies the portions where the vehicle frame 500 and the adjacent lane areas $SV_{(R)}$ and $SV_{(L)}$ overlaps with each other, i.e. the areas A in the two-dot chain line in FIG. 7, are specified as the obstructed area. Subsequently, when the CPU 3a judges that the specified areas A occupys almost the whole portions of the adjacent lane areas $SV_{(R)}$ and $SV_{(L)}$ and therefore judges that the detection of the approaching vehicle traveling on the adjacent lanes cannot be carried out (Step S14, N), the process returns to Step S2. At on the other hand, when there exists even a little an area where the detection of an approaching vehicle is possible in the adjacent lane areas $SV_{(R)}$ and $SV_{(L)}$ (Step S14, Y), the CPU 3a executes the detection of the optical flow diverging from the FOE in the adjacent lane areas $SV_{(R)}$ and $SV_{(L)}$ except the respective areas A and stores the detected optical flow in the divergent optical flow memory 2f (Step S15).

Contrary, when there is not an abnormally approaching following vehicle and when "N" has been obtained at Step 8, 10 or 11, the CPU 3a executes the detection of the optical flow diverging from the FOE in the whole adjacent lane areas $SV_{(R)}$ and $SV_{(L)}$ and stores the detected optical flow in the divergent optical flow memory 2f (Step S16). With the above Steps S15, S16, the CPU 3a acts as an optical flow detecting means.

And then, the CPU 3a acts as a danger judging means and judges that there exists an abnormally approahed following vehicle in the adjacent lane when the length of the optical flow stored in the divergent optical flow memory 2f is not less than the predetermined value (Step S17, Y). At this time, if a blinker signal S1 is outputted from the blinker detection sensor 4 (Step S18, Y), the CPU 3a judges that a changing lanes is dangerous and issues an alarm to the speaker 5a and the display 5b (Step 19).

When the length of the optical flow is below the predetermined value (Step 17, N) or the blinker signal S1 is not outputted (Step 18, N), the process returns to Step S2.

In the embodiment stated above, in the similarity-degree calculating processing the vehicle candidate image D6 shifts on one frame memory with a plurality of vehicle images D5, while carrying out the operation of the similarity-degree by means of the matching. This method is generally called the matched filtering, which has an advantage of obtaining the similarity-degree by one matching processing for one vehicle candidate image D6.

And, in the embodiment stated above, the detection of the optical flow is executed in the adjacent lane areas $SV_{(R)}$ and $SV_{(L)}$ except the specified areas A. Like this, an approaching vehicle can be detected if there is even a smalle are, in the adjacent lane area $SV_{(R)}$ of $SV_{(L)}$, which can be image-taken by the camera 1. Besides, by judging the degree of danger based on the optical flow detected from the taken-image except the area A, the following vehicle 100 can be prevented from being mis-detected as an adjacent vehicle traveling on the adjacent lane, thereby improving the reliability for judging dangerousness.

Further, in the embodiment stated above, the area specifying processing is executed before detecting the optical flow. By doing like this, in the optical flow detection processing only the detection of the optical flow is sufficient for the taken-image pixels D2 or D3 except the area A, whereby the image processing can be efficient.

And, in the embodiment stated above, though the camera 1 is installed at the rear-and-side, the camera 1 may be installed at the front-and-side.

And, in the embodiment stated above, the camera 1 detects the abnormally approaching following vehicle based on the taken-image. However, an ultrasonic sensor, for example, can be applicable for detecting the following vehicle.

Further, in the embodiment stated above, the degree of danger is judged by detecting an approaching vehicle by using the optical flow in a taken-image obtained by the camera 1. However, the present system can be applied to a modified system wherein a position of an approaching vehicle with respect to the subject vehicle is calculated, for example, by using two cameras and the degree of danger can be judged based on the calculated position.

According to the above-described structures of the present invention, the following advantages are provided.

(1) Because the alarm generating means informs that an image-taking of the adjacent lane by the image-taking means is obstructed so that the driver can recognize that the detection of an approaching vehicle traveling on the adjacent lane can not be carried out, the vehicle-use surroundings monitoring system can prevent the driver from driving without knowing that the detection of an approaching vehicle traveling in the adjacent lane area cannot be done.

(2) Because the existence of an abnormally approached vehicle can be judged by detecting the abnormally approached vehicle based on the taken-image without providing an extra means other than the image-taking means, the vehicle-use surroundings monitoring system with reduced cost can be obtained.

(3) Because the similarity-degree of the vehicle candidate image against the vehicle images can be calculated, the vehicle-use surroundings monitoring system facilitating the detection of the vehicle can be obtained.

(4) Because the matching is executed by shifting the vehicle candidate image over the frame memory on which two or more kinds of vehicle images are arranged, the calculation of the similarity-degree against the two or more kinds of vehicle images can be done with one matching processing for one vehicle candidate image, whereby the vehicle-use surroundings monitoring system attaining reducion of the similarity-degree calculation can be obtained.

(5) When there exists even a little area where the detection of an approaching vehicle is possible by the image-taking means in the adjacent lane areas, an approaching vehicle can be detected. Besides, an adjacent vehicle traveling in the adjacent lane can be prevented from being mis-detected as a just following vehicle or a preceding vehicle by judging the degree of danger about an approaching vehicle detected in the area where the image-taking is obstructed, whereby the vehicle-use surroundings monitoring system with improved reliability in judging dangerousness can be obtained.

(6) Because the image processing is executed for the taken-image except the specified area, the vehicle-use surroundings monitoring system attaining reduction of the image processing can be obtained.

(7) Since the approaching vehicle can be detected on the basis of the size of the optical flow, two image-taking means does not need to be used, thereby attaining cost reduction.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A vehicle-use surroundings monitoring system comprising:

an image-taking means installed on a subject vehicle to take an image of surroundings of the subject vehicle to obtain a taken-image;

an approaching vehicle detecting means to detect, by image-processing the taken-image, an approaching vehicle approaching the subject vehicle from an adjacent lane area;

a danger judging means to judge dangerousness about the approaching vehicle detected;

an existence judging means to judge an existence of an abnormally approaching following vehicle traveling on an subject lane ahead of or behind the subject vehicle and obstructing to image-take the adjacent lane area by the image-taking means; and an alarm generating means to give out an alarm when the existence judging means judges that the abnormally approaching following vehicle exists.

2. The vehicle-use surroundings monitoring system as set forth in claim 1, wherein the existence judging means has an imaged vehicle detecting means to image-process the taken-image in order to detect an image-taken vehicle having been image-taken by the image-taking means, and the existence of the abnormally approaching following vehicle is judged based on the image-taken vehicle detected.

3. The vehicle-use surroundings monitoring system as set forth in claim 2, wherein the imaged vehicle detecting means has
a storing means having stored vehicle images giving shape of respective vehicles,
an extracting means to extract a vehicle candidate image to be a candidate of the image-taken vehicle from the taken-image, and
a similarity calculating means to calculate a similarity-degree between the vehicle images and the vehicle candidate image, and
the image-taken vehicle is detected when the similarity-degree is not less than a predetermined value.

4. The vehicle-use surroundings monitoring system as set forth in claim 3, wherein the storing means stores two or more kinds of vehicle images on one frame memory in order, and
the similarity calculating means shifts the vehicle candidate image on the frame memory, executes a matching with each of the vehicle images, and calculates the similarity-degree.

5. The vehicle-use surroundings monitoring system as set forth in claim 1, further comprising:

an area specifyng means to specify an area, where an image-taking is obstructed by the abnormally approaching following vehicle, in the adjacent lane area when the existence judging means judges that the abnormally approaching following vehicle exists, and
the danger judging means judges a degree of danger about the approaching vehicle traveling on the adjacent lane area except the area specified.

6. The vehicle-use surroundings monitoring system as set forth in claim 5, wherein an specifying by the area specifying means is executed before a detection by the approaching vehicle detecting means, and
the approaching vehicle detecting means image-processes the adjacent lane area except the area specified and detects the approaching vehicle.

7. The vehicle-use surroundings monitoring system as set forth claim 1, wherein the approaching vehicle detecting means has
an area setting means to set the adjacent lane area on the taken-image based on separation lines provided on a road surface and
an optical flow detecting means to detect, as an optical flow, a movement of a same point in two adjacent lane areas obtained by the image-taking means with an interval of a specified time, and
the danger judging means judges the dangerousness based on a size of the optical flow detected by the optical flow detecting means.

8. The vehicle-use surroundings monitoring system as set forth claim 2, wherein the approaching vehicle detecting means has
an area setting means to set the adjacent lane area on the taken-image based on separation lines provided on a road surface and
an optical flow detecting means to detect, as an optical flow, a movement of a same point in two adjacent lane areas obtained by the image-taking means with an interval of a specified time, and
the danger judging means judges the dangerousness based on a size of the optical flow detected by the optical flow detecting means.

9. The vehicle-use surroundings monitoring system as set forth claim 3, wherein the approaching vehicle detecting means has
an area setting means to set the adjacent lane area on the taken-image based on separation lines provided on a road surface and
an optical flow detecting means to detect, as an optical flow, a movement of a same point in two adjacent lane areas obtained by the image-taking means with an interval of a specified time, and
the danger judging means judges the dangerousness based on a size of the optical flow detected by the optical flow detecting means.

10. The vehicle-use surroundings monitoring system as set forth claim 4, wherein the approaching vehicle detecting means has
an area setting means to set the adjacent lane area on the taken-image based on separation lines provided on a road surface and
an optical flow detecting means to detect, as an optical flow, a movement of a same point in two adjacent lane areas obtained by the image-taking means with an interval of a specified time, and
the danger judging means judges the dangerousness based on a size of the optical flow detected by the optical flow detecting means.

11. The vehicle-use surroundings monitoring system as set forth claim 5, wherein the approaching vehicle detecting means has
an area setting means to set the adjacent lane area on the taken-image based on separation lines provided on a road surface and
an optical flow detecting means to detect, as an optical flow, a movement of a same point in two adjacent lane areas obtained by the image-taking means with an interval of a specified time, and
the danger judging means judges the dangerousness based on a size of the optical flow detected by the optical flow detecting means.

12. The vehicle-use surroundings monitoring system as set forth claim 6, wherein the approaching vehicle detecting means has
an area setting means to set the adjacent lane area on the taken-image based on separation lines provided on a road surface and
an optical flow detecting means to detect, as an optical flow, a movement of a same point in two adjacent lane areas obtained by the image-taking means with an interval of a specified time, and
the danger judging means judges the dangerousness based on a size of the optical flow detected by the optical flow detecting means.

* * * * *